May 5, 1953  B. A. McKEAN  2,637,232
TAPPED INSERT DRIVER
Filed March 21, 1952
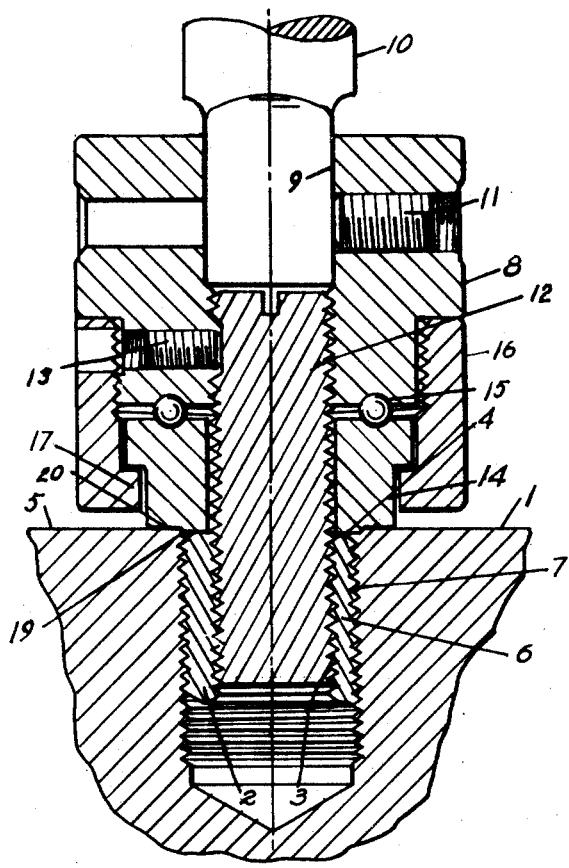
INVENTOR.
BY Boyd A. McKean
Ralph Hammar
attorney

UNITED STATES PATENT OFFICE 2,637,232

TAPPED INSERT DRIVER

Boyd A. McKean, Erie, Pa., assignor to Titan Tool Company, Fairview, Pa., a corporation of Pennsylvania Application March 21, 1952, Serial No. 277,878

1 Claim. (Cl. 81—53)

In aluminum castings such as aircraft engine blocks, tapped steel inserts are used for the cylinder head bolts. These inserts are threaded into the casting and keyed in place in a semi-permanent manner. The inserts usually have to be set flush with or below the surface of the casting so as not to interfere with the seating of the cylinder head. This invention and insert driver is intended to set or thread the inserts to the desired position and to eliminate the reverse or unthreading movement of the insert which has heretofore been a problem.

In the drawing, the figure is a section through the insert driver at the start of the reverse movement of the driver out of an insert.

1, represents a section through a soft metal casting such as an aircraft engine block which has threaded therein a hardened steel insert or bushing 2 tapped at 3 for a cylinder head bolt. The upper end face 4 of the insert is slightly below the surface 5 on which the cylinder head is to be clamped so the insert in no way interferes with the seating of the cylinder head. The insert has a coarse external thread 6 which is threaded into a tapped hole 7 in the casting. The fit of the thread 6 is not relied upon to keep this insert from turning in the hole 7 and to thereby change the position of the insert in the casting. The insert has to be keyed in place by suitable means before it can be used with a bolt. However, the keying of the insert is a separate operation which follows the driving of the insert and since this invention is only concerned with the driving of the insert, the keying or locking of the insert is not shown.

The driver has a body 8 having a non-circular recess 9 for a reversible drive shaft 10 locked therein by a set screw 11. The drive shaft may, for example, be driven by a reversible compressed air motor such as used for tapping. The body has threaded therein a threaded drive member 12 which is threaded into the tapped opening 3 in the insert. The drive member is locked to the body 8 by a set screw 13. On the lower end of the body is an annular stop 14 rotatably carried by a ball thrust bearing 15. A sleeve 16 threaded on the body has an inwardly extending flange 17 which loosely holds the stop in place. On the lower end of the stop is a bead or shoulder 19 which cooperates with the upper end 4 of the insert and around the bead is a surface 20 which cooperates with the surface 5 of the casting to limit the depth to which the insert is driven.

In the use of the driver, an insert 2 is threaded on the drive member 12 and the insert threaded into the tapped hole 7 in the casting. The driving torque causes the upper end 4 of the insert to seat solidly against the bead 19 on the stop 14. When the surface 20 on the stop strikes the surface 5 on the casting, the insert can be driven no further and the motor driving the shaft 10 stalls. The operator now reverses the motor and the drive member 12 unthreads out of the insert.

It is important that the insert not be unthreaded from the tapped hole 7 by the reverse or unthreading torque of the drive member 12. If there were any unthreading of the insert, the upper end of the insert would project above the surface 5 of the casting. At the end of the driving operation, the insert is merely threaded into the tapped hole 7 and the keying or locking arrangements which are later to be supplied are not available to block the unthreading of the insert.

Unthreading of the insert upon reversal of the drive is prevented by the ball bearing stop 14. At the instant the drive shaft 10 is stalled, the surface 20 on the stop is jammed against the surface 5 on the casing 1, thus positively locating the upper end 4 of the insert the desired distance below the surface of the casting determined by the projection of the bead 19 below the surface 20. The stall torque of the drive shaft 10 is much greater than the resistance offered to the driving of the bushing threads 6 into the tapped hole 7. The stall torque from the drive shaft 10 forces the threads on the drive member 12 against the bottom slopes of the threads 3 on the insert and lifts the insert into tight engagement with the bead 19 which jams the stop 14 against the surface 5 on the casting. Upon reversal of the drive shaft 10, the drive member 12 is threaded out of the threads 3 in the insert without unthreading the insert from the casting. The drive member 12 initially starts to unthread from the threads 3 of the insert because the thread clearance is on the upper side of the threads on the drive member 12 and because the stop 14 by its friction drag tends to hold the insert in the casting. The ball thrust bearing 15 permits the shaft 10 to turn relative to the stop. After the drive member has started to unthread from the insert, the static friction on the external threads 6 of the insert which is greater than the running friction on the internal threads 3 of the insert is sufficient to hold the insert in the casting.

With this driver, the inserts are driven or set in a fixed position relative to the casting. Of course, the inserts must be keyed or locked to the casting, but this is a separate operation.

What I claim is:

A tool for driving externally threaded internally tapped inserts or bushings into threaded holes in a structure, comprising a body for connection to a reversible power drive, the body having an externally threaded drive member for threading into the insert, a stop, means rotatably mounting the stop on the body and including a thrust bearing forming an anti-friction connection between the stop and body, said stop having a surface engaging the upper end face of an insert threaded on the drive member and a surface engaging the structure to limit the depth the insert is driven into the structure, the thrust bearing permitting reverse movement of the drive member in relation to the stop upon reversal of the power drive while the jamming of the stop against the structure initially holds the insert against reverse movement out of the threaded hole in the structure.

BOYD A. McKEAN.

References Cited in the file of this patent

UNITED STATES PATENTS

| Number | Name | Date |
|---|---|---|
| 1,030,732 | Jenkins et al. | June 25, 1912 |
| 1,525,545 | James | Feb. 10, 1925 |
| 2,263,871 | Duffy | Nov. 25, 1941 |
| 2,550,866 | Rosan | May 1, 1952 |